United States Patent
Housty

(10) Patent No.: US 7,251,744 B1
(45) Date of Patent: Jul. 31, 2007

(54) MEMORY CHECK ARCHITECTURE AND METHOD FOR A MULTIPROCESSOR COMPUTER SYSTEM

(75) Inventor: Oswin Housty, Austin, TX (US)

(73) Assignee: Advanced Micro Devices Inc., Sunnyvale, CA (US)

( * ) Notice: Subject to any disclaimer, the term of this patent is extended or adjusted under 35 U.S.C. 154(b) by 386 days.

(21) Appl. No.: 10/763,009

(22) Filed: Jan. 21, 2004

(51) Int. Cl.
G06F 11/00 (2006.01)
(52) U.S. Cl. .............................. 714/7; 714/36
(58) Field of Classification Search ............... None
See application file for complete search history.

(56) References Cited

U.S. PATENT DOCUMENTS

| | | | |
|---|---|---|---|
| 5,099,485 A * | 3/1992 | Bruckert et al. | 714/11 |
| 5,327,548 A * | 7/1994 | Hardell et al. | 711/147 |
| 5,673,388 A | 9/1997 | Murthi et al. | |
| 5,740,349 A * | 4/1998 | Hasbun et al. | 714/8 |
| 5,867,702 A * | 2/1999 | Lee | 713/1 |
| 6,158,000 A | 12/2000 | Collins | |
| 6,279,089 B1 * | 8/2001 | Schibilla et al. | 711/162 |
| 6,381,715 B1 * | 4/2002 | Bauman et al. | 714/718 |
| 6,434,696 B1 | 8/2002 | Kang | |
| 6,571,347 B1 * | 5/2003 | Tseng | 714/6 |
| 7,058,782 B2 | 6/2006 | Henderson et al. | |
| 7,065,688 B1 * | 6/2006 | Moyes et al. | 714/718 |
| 7,194,660 B2 * | 3/2007 | Edrich | 714/36 |
| 2001/0047497 A1 | 11/2001 | Bland et al. | |
| 2002/0016891 A1 * | 2/2002 | Noel et al. | 711/153 |
| 2002/0170014 A1 * | 11/2002 | Kocol et al. | 714/763 |
| 2004/0230767 A1 | 11/2004 | Larson et al. | |

FOREIGN PATENT DOCUMENTS

JP 358169662 A * 10/1983

* cited by examiner

*Primary Examiner*—Gabriel Chu
(74) *Attorney, Agent, or Firm*—Larson Newman Abel Polansky & White, LLP

(57) ABSTRACT

Methods and apparatus are provided for use in testing a memory (220, 230, 240) in a multiprocessor computer system (200). The multiprocessor computer system (200) has a plurality of processing nodes (210-217) coupled in an array wherein each processing node is coupled to at least one other processing node, and a memory (220, 230, 240) distributed among the plurality of processing nodes (210-217). A configuration of the array is determined. An initial configuration of the memory (220, 230, 240) is also determined. The memory (220, 230, 240) is tested over the array according to the initial configuration to identify a bad memory element. The initial configuration is modified to form a revised configuration that excludes the bad memory element.

23 Claims, 5 Drawing Sheets

MEMORY CHECK ARCHITECTURE AND METHOD FOR A MULTIPROCESSOR COMPUTER SYSTEM

TECHNICAL FIELD

The present invention generally relates to data processing systems, and more particularly relates to multiprocessor data processing systems.

BACKGROUND

A computer system is generally defined in terms of three basic system elements: a central processing unit (CPU), memory, and input/output (I/O) peripheral devices. A typical computer system works with a computer program known as an operating system (OS). The OS is a program that manages all other programs in a computer, the user interface, the interface with peripheral devices, memory allocation, and so forth. Each OS is written for a variety of system configurations such as variable physical memory size, various numbers of peripherals connected to the system, etc. and thus it can remain ignorant of the actual system configuration.

On the other hand the basic input/output system (BIOS) is a computer program that uses the actual system configuration to manage data flow between the OS and attached memory and I/O peripherals. The BIOS can translate OS requests into concrete actions that the CPU can take in response. The BIOS is usually stored on a nonvolatile memory device such as a read-only memory (ROM) and may be programmed for the particular system configuration.

The BIOS also manages operation of the computer system after startup and before control is passed to the OS. The BIOS typically performs a memory check after power-on to determine whether the memory physically present in the system is operational and can be used by the OS. The BIOS first determines the amount of memory present in the system. It may use a so-called system management (SM) bus to interrogate the memory devices present in the system and thus to determine the nominal size of the memory. Then the BIOS performs a memory test to detect the presence of bad memory elements and to take corrective action if it finds any. Finally it passes control to the OS but thereafter is periodically called by the OS to perform system specific I/O functions.

Recently multiprocessor computer architectures have been introduced for such applications as servers, workstations, personal computers, and the like. In one such multiprocessor architecture the physical memory is distributed among multiple processor nodes, but the BIOS runs on a single processor (known as the boot strap processor), making the memory test significantly more complex. In known multiprocessor systems if any of the memory elements fail the memory test, the boot strap processor reports the failure on a startup screen and halts the power on sequence.

Accordingly, it would be desirable to have a BIOS that efficiently performs a memory test and takes corrective actions to allow the system to continue operating in a multiprocessor, distributed memory environment despite the presence of the bad memory element. These and other desirable features and characteristics of the present invention will become apparent from the subsequent detailed description and the appended claims, taken in conjunction with the accompanying drawings and the foregoing technical field and background.

BRIEF SUMMARY

A method of testing a memory is provided for use in a multiprocessor computer system having a plurality of processing nodes coupled in an array wherein each processing node is coupled to at least one other processing node and in which the memory distributed among the plurality of processing nodes. A configuration of the array is determined. An initial configuration of the memory is also determined. The memory is tested over the array according to the initial configuration to identify a bad memory element. The initial configuration is modified to form a revised configuration that excludes the bad memory element.

Another method of testing a memory is provided for use in a multiprocessor computer system having a plurality of processing nodes and in which the memory which is distributed among the plurality of processing nodes. The memory is configured by programming the plurality of processing nodes with an initial configuration. The memory is tested using the initial configuration to identify a bad memory element. A node and a region defined on the node which are associated with the bad memory element are determined. The memory is reconfigured by programming the plurality of processing nodes with a revised configuration that excludes the region. The multiprocessor computer system is operated using the revised configuration.

A basic input/output system (BIOS) is also provided for use in a multiprocessor computer system including a plurality of processing nodes coupled in an array wherein each processing node is coupled to at least one other processing node, and a memory distributed among the plurality of processing nodes. The BIOS is adapted to be coupled to one of the plurality of processing nodes, designated a boot strap processor (BSP), and comprises first, second, third, and fourth sets of instructions. The first set of instructions is executable by the BSP to determine a configuration of the array. The second set of instructions is executable by the BSP to determine an initial configuration of the memory. The third set of instructions is executable by the BSP to test the memory aver the array according to the initial configuration to identify a bad memory element. The fourth set of instructions is executable by the BSP to modify the initial configuration to form a revised configuration that excludes the bad memory element.

Another form of the BIOS is provided for use in a multiprocessor computer system including a plurality of processing nodes coupled in an array wherein each processing node is coupled to at least one other processing node, and a memory distributed among the plurality of processing nodes. The BIOS is adapted to be coupled to one of the plurality of processing nodes, designated a boot strap processor (BSP), and comprises first, second, third, fourth, and fifth sets of instructions. The first set of instructions is executable by the BSP to configure the memory by programming the plurality of processing nodes with an initial configuration. The second set of instructions is executable by the BSP to test the memory using the initial configuration to identify a bad memory element. The third set of instructions is executable by the BSP to determine a node and a region defined on the node which are associated with the bad memory element. The fourth set of instructions is executable by the BSP to reconfigure the memory by programming the plurality of processing nodes with a revised configuration that excludes the region. The fifth set of instructions is executable by the BSP to operate the multiprocessor computer system using the revised configuration.

BRIEF DESCRIPTION OF THE DRAWINGS

The present invention will hereinafter be described in conjunction with the following drawing figures, wherein like numerals denote like elements.

FIG. 4 is a timing diagram illustrating the operation of the boot strap processor of FIG. 2 after power on;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
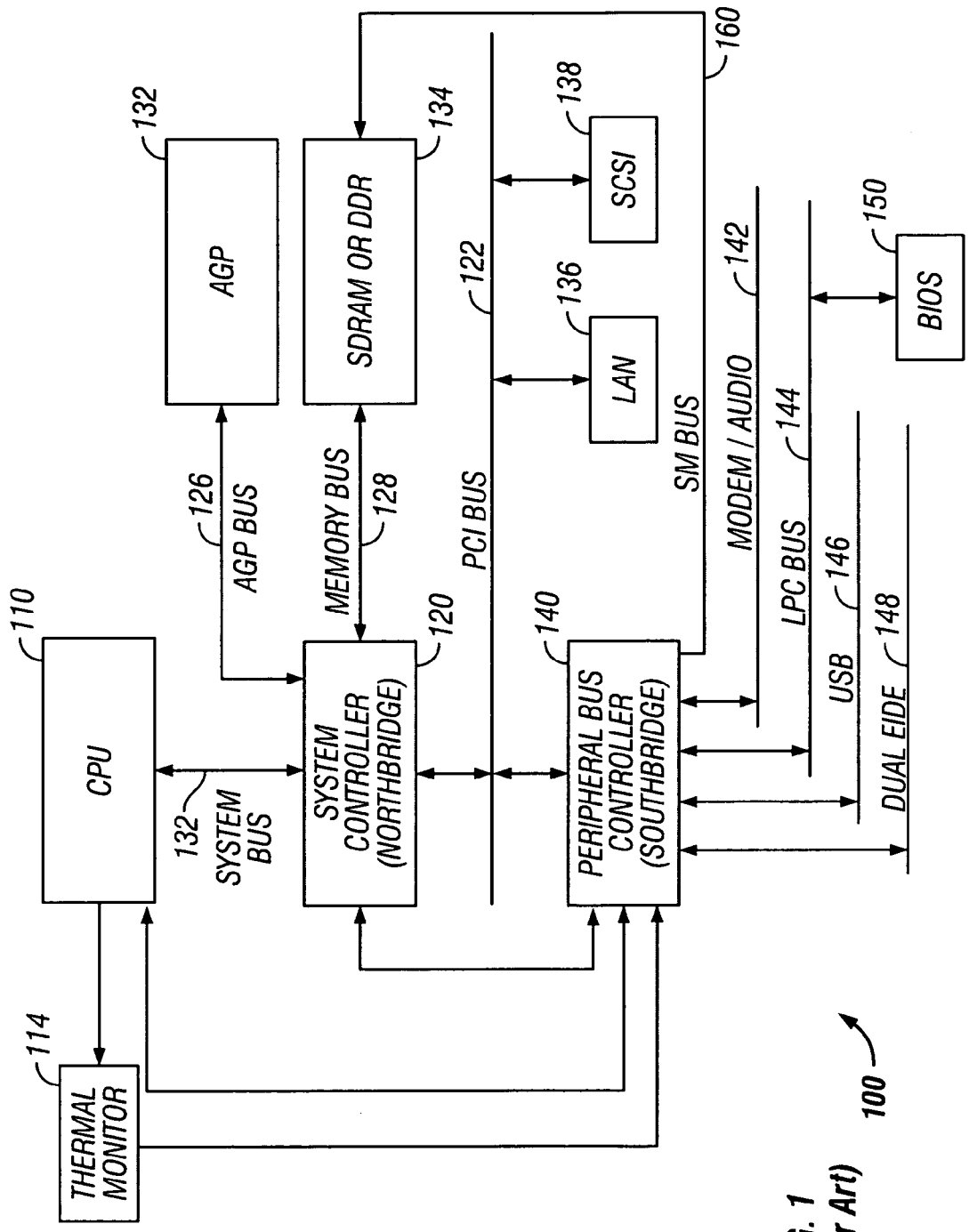
FIG. 1 illustrates a block diagram of a personal computer (PC) system known in the prior art.

FIG. 1 illustrates a block diagram of a computer system 100 known in the prior art. Generally computer system 100 is a conventional personal computer (PC) system having an architecture adapted from the PC architecture first designed by the International Business Machines Corporation. Computer system 100 includes a high-performance central processing unit (CPU) 110 that executes instructions of the so-called x86 instruction set such as the microprocessor sold under the Athlon trademark available from Advanced Micro Devices of Sunnyvale, Calif. The x86 instruction set is based on the instruction set of the 8086 microprocessor first manufactured by Intel Corporation of Santa Clara, Calif. CPU 110 generally interfaces to external devices over a system bus 132 by which it is coupled to a system controller 120, conventionally referred to as a "Northbridge". Northbridge 120 offloads CPU 110 of the task of communicating with high performance system resources which may have different bus structures. One of these devices is main memory 134 in the form of synchronous dynamic random access memory (SDRAM) or double data rate (DDR) SDRAM over a dedicated memory bus 128. Another one of these devices is an advanced graphics processor (AGP) 132 over an AGP bus 126.

Northbridge 120 is also connected to a lower performance peripheral component interconnect (PCI) bus 122 to which several other devices, including a local area network (LAN) controller 136 and a small computer system interface (SCSI) controller 138, are connected. Also connected to PCI bus 122 is a peripheral bus controller 140, conventionally referred to as a "Southbridge", for coupling to even lower performance devices. Southbridge 122 has various dedicated buses including a modem/audio bus 142, a Low Pin Count (LPC) bus 144, a universal serial bus (USB) 146, and a dual Enhanced Integrated Drive Electronics (EIDE) bus 148. One of the devices coupled to LPC bus 144 is a basic input/output system (BIOS) read only memory (ROM) chip 150. Southbridge 140 is connected to a thermal monitor 114 which is connected to CPU 110 and allows Southbridge 140 to perform power management functions if CPU 110 exceeds a certain temperature during operation. Southbridge 140 has a bidirectional connection to CPU 110 by which CPU 110 programs it for operation.

In addition, Southbridge 140 has a bus known as a system management (SM) bus labeled "SM BUS" 160 by which it is connected to memory 134. SM BUS 160 is the mechanism by which CPU 110, under the control of the BIOS program stored in BIOS ROM 150, is able to perform memory tests on memory 134 at startup. This conventional memory test may be performed as follows. After CPU 110 comes up out of reset, it fetches a reset vector pointing to a location in BIOS ROM 150 containing the startup program sequence. One of the items performed in the startup program sequence is to determine the configuration of memory 134. The BIOS directs Southbridge 140 to poll memory 134 over SM bus 160 to determine how much memory is installed. After determining the memory configuration, the BIOS performs a memory check through Northbridge 120. For example, the BIOS may cause CPU 110 may to write a predefined test pattern (e.g., $55) to all memory locations, and subsequently read the memory locations to determine whether the test pattern was correctly stored. Later an opposite test pattern may be applied (e.g., $AA) to all memory locations and read back to determine whether each memory cell may assume either logic state. Any bad memory element is noted and used to configure Northbridge 120, and in this way, bad memory may be mapped out of the system.

While this type of test can be efficiently performed on PCs which have a relatively small amount of memory, it becomes more difficult as the size of memory becomes larger. Furthermore new computers based on multiprocessor architectures may have their memory distributed among many system nodes, but configure the system using a BIOS program connected to a single node. In such a system this simple local memory test and reconfiguration will no longer suffice.

Figure 2:
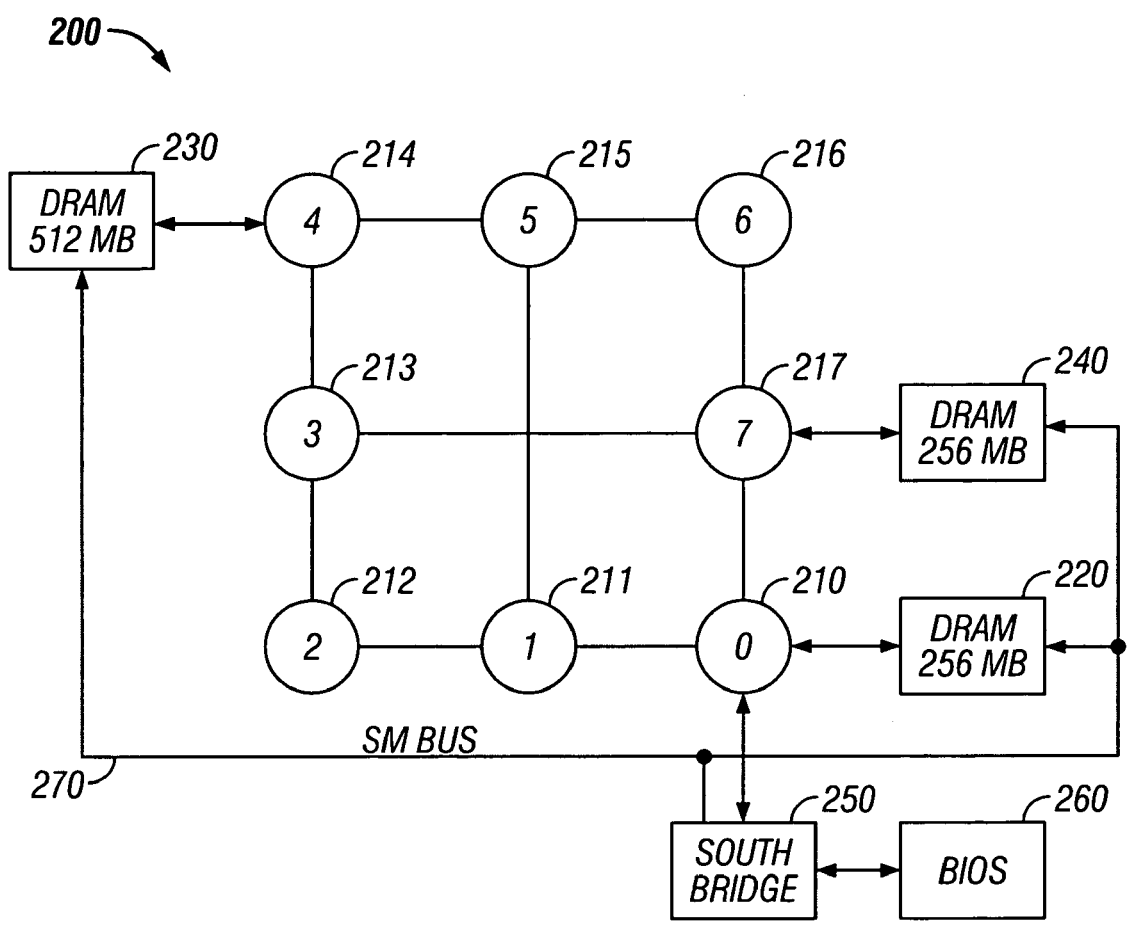
FIG. 2 illustrates a block diagram of a multiprocessor computer system according to the present invention.

An alternate way of performing a memory test in a multiprocessor computer system can be better understood with reference to FIG. 2, which illustrates a block diagram of a multiprocessor computer system 200 according to the present invention. Computer system 200 includes generally eight processor nodes 210-217 connected in an array or fabric in which each node is connected to one or more adjacent nodes. For example, system 200 is an eight-processor system in which node 210 labeled "0" is connected to adjacent nodes 1 and 7; node 211 labeled "1" is connected to adjacent nodes 0, 2, and 5; and so on. Each node used in system 200 has three available link controllers which are connected to either adjacent processor nodes or to I/O devices. Since nodes 0, 2, 4 and 6 use only two of their available three link controllers to connect to adjacent processor nodes, they have an additional link controller available for connection to I/O devices.

Each node in system 200 also has the capability to connect to local memory that will be directly accessible to it and indirectly accessible to all other processor nodes. In system 200, for example, node 210 is connected to a 256 megabyte (MB) DRAM 220, node 214 is connected to a 512 MB DRAM memory 230, and node 217 is connected to a 256 MB DRAM memory 240. However many other memory configurations are possible using various array configurations and memory may in fact be present on all of the nodes.

While the physical memory in system 200 is distributed among the nodes, all the memory is visible to every node. Thus the array is configured by programming respective nodes with configuration information. This configuration information can be used to form a system address map, which is a table of all memory and memory-mapped I/O devices in the system, and a node address map. If the processor in node 210 initiates an access to a particular physical address, the memory controller in node 210 will determine whether the physical address corresponds to a location in local memory 220 or in remote memory. If the physical address is in local memory, the memory controller initiates an access by providing a relative node address (RNA) to an internal DRAM controller (to be explained more fully below) which then accesses DRAM 220. If the physical address is in remote memory, the memory controller determines the node number corresponding to the physical address and issues a request packet addressed to that node. The request packet eventually reaches the memory controller in the accessed node after it "hops" between the nodes over the array using the appropriate link controllers.

In order to determine the memory configuration in this multiprocessor system, one of the nodes is selected to be the boot strap processor (BSP). In system 200, node 210 is the BSP (referred to hereinafter as BSP 210), and it includes a link controller connected to an I/O device in the form of a Southbridge 250, which in turn is connected to a BIOS ROM 260. Note that as used herein "BIOS" refers to either the software stored in BIOS ROM 260 or the device storing the software, as the context dictates. Note that the BIOS can be stored in any of a variety of known storage media, including an erasable programmable ROM (EPROM), and electrically erasable programmable ROM (EEPROM), a flash EEPROM, and the like.

The selection of the node to be the BSP occurs as follows. On power up, the processor in each node contains startup microcode that sends packets on all three of its link controllers to determine what kind of device the respective link controller is connected to. For example, the first link controller on node 210 detects that it is connected to a processor (node 211), the second link controller detects that it is connected to a processor (node 217), and the third link controller detects that it is connected to a Southbridge (Southbridge 250). In response to detecting that its third link controller is connected to a Southbridge, node 210 becomes the BSP and accesses BIOS 260 to begin the startup sequence for the system.

Southbridge 250 is connected to all the memory devices in system 200 over an SM BUS 270. Thus at startup the BIOS executing on BSP 210 uses SM BUS 270 to determine the amount and node location of memory devices in the system and to communicate the initial configuration to the array. The BIOS communicates this information to the array by programming the memory controllers and DRAM controllers in respective nodes with the configuration information. After the initial configuration has been determined, the BIOS performs a memory test, determines where any bad memory elements are located, and subsequently maps them out.

Figure 3:
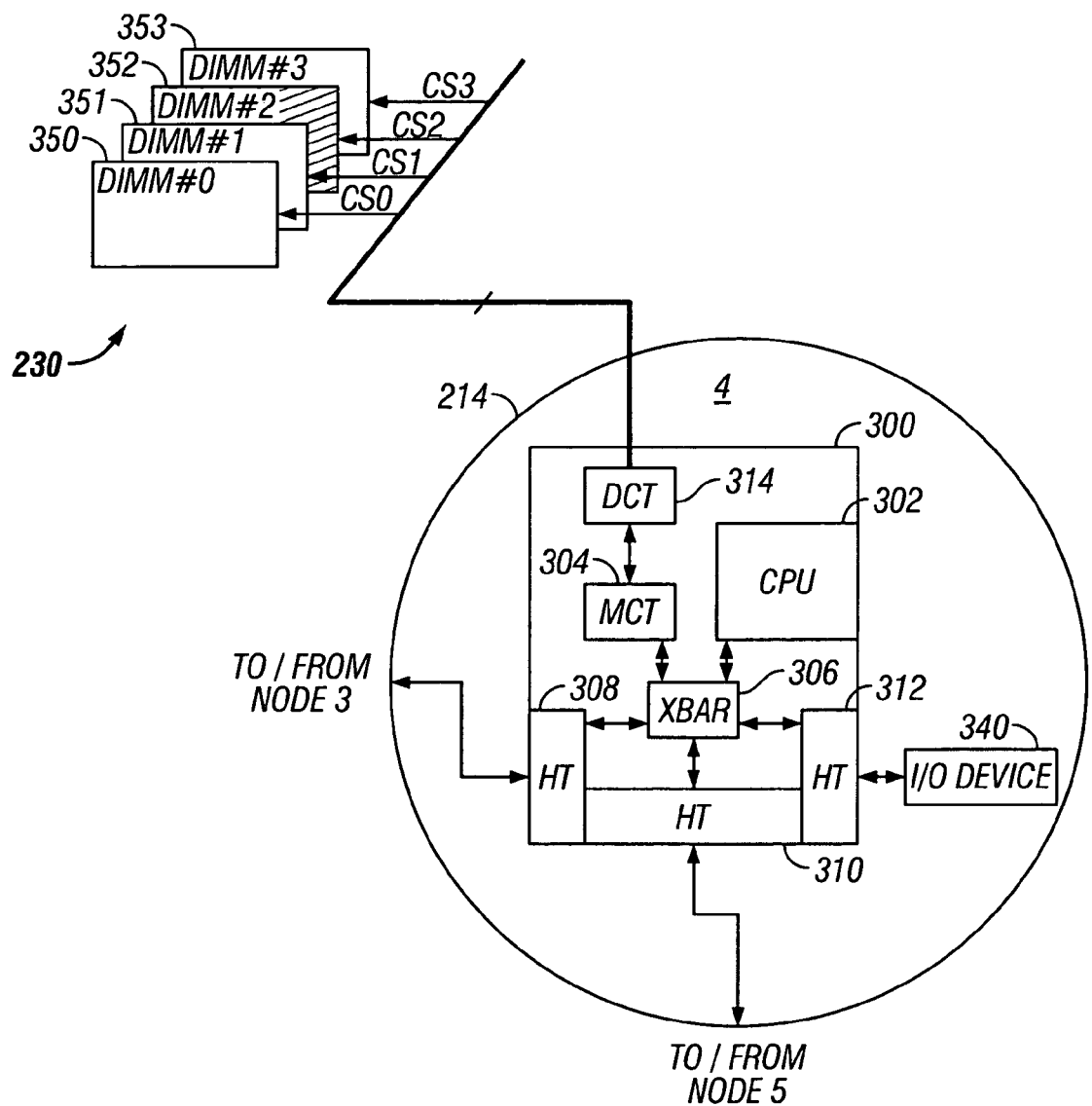
FIG. 3 illustrates in block diagram form a portion of the computer system of FIG. 2 having a bad memory element.

To explain how BSP 210 configures and tests the memory, reference is now made to FIG. 3, which illustrates in block diagram form a portion of computer system 200 of FIG. 2 having a bad memory element. This portion includes node 214 and its associated local memory 230 both shown in greater detail. Node 214 includes a data processor in the form of a single-chip microprocessor 300 and an input/output (I/O) device 340. Microprocessor 300 includes generally a central processing unit (CPU) 302, a memory controller labeled "MCT" 304, a crossbar switch labeled "XBAR" 306, three link controllers 308, 310, and 312 each labeled "HT" for HyperTransport, described more fully below, and a DRAM controller (DCT) 314.

CPU 302 is a processor adapted to execute instructions of the x86 instruction set. CPU 302 however includes many sophisticated functions for high-performance execution of x86 programs including pipelining and superscalar design.

Memory controller 304 is the mechanism for data transfer between CPU 302 and both its local memory and remote memory distributed throughout the rest of the system. Memory controller 304 offloads the task of initiating and terminating memory accesses from CPU 302 and thus functions as an integrated Northbridge. It includes internal queues to allow efficient use of the external bus to the local memory. It also includes memory maps to determine whether an address of a memory access is intended for local memory or for remote memory, in which case it initiates a request packet to another node connected to node 214 via HT link controller 308 or 310.

XBAR 306 is a switching/multiplexing circuit designed to couple together the buses internal to microprocessor 300.

HT link controllers 308, 310, and 312 are coupled to devices external to microprocessor 300 over corresponding input and output channels. Each of HT link controllers 308, 310, and 312 substantially complies with the physical interface specified in the HyperTransport™ I/O Link Specification, Revision 1.03, ® 2001 HyperTransport Technology Consortium. In node 214 HT link controllers 308 and 310 function as coherent links that communicate with nodes 213 and 215 of FIG. 2, respectively, using a special coherent form of HyperTransport. HT link controller 312 functions as a host bridge that communicates with I/O device 340 using the non-coherent form of HyperTransport. Details of the HyperTransport protocol are not relevant to understanding the present invention and will not be discussed further.

I/O device 340 is an input/output device that, for example, implements the local area network communication protocol standardized by the Institute of Electrical and Electronics Engineers (IEEE) under the auspices of the IEEE 802.3 committee, commonly referred to as "Ethernet". However other types of I/O functions are possible as well.

Local memory 230 includes four dual in-line memory modules (DIMMs) 350-353. DIMMs 350-353 are banks of dynamic random access memories (DRAMs) and interface to microprocessor 300 using a conventional bus interface. For example, the DRAMs in DIMMs 350-353 comply with the JEDEC Double Data Rate (DDR) SDRAM Specification, Standard JESD79, Release 2, May 2002. In order to efficiently interface to multiple banks of memory using DDR timing specifications, microprocessor 300 includes DCT 314 to operate the interface between memory controller 304 and DIMMs 350-353. In addition to generating standard synchronous address, data, and control signals as specified in JESD79, DRAM controller 314 also includes memory region programming and comparison logic to generating unique chip select signals to activate selected ones of DIMMs 350-353. As shown in FIG. 3, DRAM controller 314 outputs chip select signals labeled "CS0", "CS1", "CS2", and "CS3" to DIMMs 350-353, respectively. Note that these chip select signals are designated logically but the physical chip select signals are conventionally active low signals.

The operation of system 200 in the presence of a bad memory element will now be described by assuming DIMM 352 is bad, i.e., one or more storage locations in DIMM 352 are or become defective causing at least one memory element in DIMM 352 to fail the BIOS memory test. In accordance with the present invention, system 200 provides a way to detect the DIMM with the bad memory element, map it out of the system, and continue operating, as will be described with reference to FIGS. 4-6 below.

Figure 4:
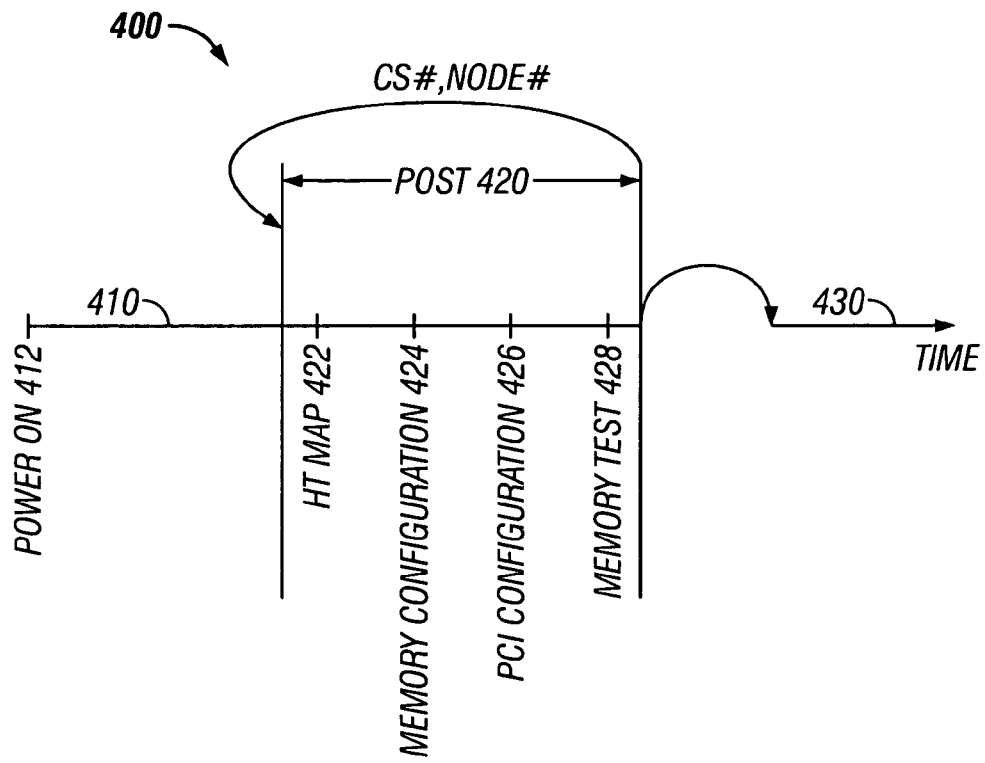

FIG. 4 is a timing diagram illustrating the operation of the BIOS running on BSP 210 of FIG. 2 after power on. FIG. 4 depicts time in the horizontal direction as flowing from left to right with various BIOS tasks depicted along the time axis. Note that the BIOS operations relevant to understanding the present invention are described but the BIOS actually performs many other startup tasks that are conventional and well understood in the art and that will not be described further. Each of the tasks illustrated in FIG. 4 is performed using appropriate sets of instructions, executable by BSP 210, coded by any of a variety of known programming techniques such as C++ language programming, assembly language programming, direct machine language coding, etc.

BSP 210 performs many initialization tasks after system startup, which can be divided generally into a system initialization portion 410 including a power on task 412 and a power-on self test (POST) 420. During POST 420, BSP 210 performs an HT map task 422 by detecting the presence and interconnection of the installed processor nodes. The HT map takes the form of a routing table that the BIOS provides to all nodes, and in this way the BIOS configures the HT fabric.

The BIOS subsequently performs a memory configuration task 424 by using SM bus 270 to detect the presence of memory and I/O devices and constructing a system address map, to be described more fully below. At this point the system address map will contain bad memory elements, such as single bytes, words or whole areas of blocks, if any are present in system 200. Memory configuration task 424 also configures the base and limit addresses of chip selects used in the DRAM controller of each node, and programs the appropriate registers in each microprocessor. The CS region information is thus distributed among the nodes of the system.

The BIOS then performs a simple memory test of an area sufficient to store PCI configuration parameters needed for a PCI configuration 426. Subsequently the video functions are enabled for error reporting prior to a memory test 428. When performing memory test 428 the BIOS tests the memory locations in system 200 according to a predetermined algorithm. Note that because it might take too long to test all physical memory locations in some systems with large memories, such as servers, memory test 428 may only sample test periodic locations. The BIOS performs additional peripheral initializations after memory test 428, and if memory test 428 has passed, the BIOS transfers control to an operating system (such as the operating systems sold under the trademarks DOS and Windows, the Linux operating system, and the like) that operates during portion 430.

If BSP 210 detects a bad physical address, it then "maps out" the bad address by determining the node number and chip select number of the failing physical address, passing these parameters back to the beginning of POST 420, and re-running POST 420. The instructions associated with memory configuration task 424 in POST 420 use these parameters to alter the memory configuration and "map out" the bad memory elements. In the illustrated system the BIOS eventually retests the reconfigured memory until it passes. It may also shut off the computer if the memory test fails after a certain number of attempts since that condition may indicate a severe system problem requiring immediate repair. Alternatively POST 420 could simply reconfigure the system and memory without retesting any memory just tested.

BSP 210 uses the HT fabric and initial memory configuration to perform the memory test on both local and remote memory. By determining the initial memory configuration before performing memory test 428 and using the HT fabric and local MCTs and DCTs to perform memory test 428, BSP 210 is able to find and fix bad memory efficiently in the multiprocessor system context. This repair operation allows the system to continue operating with a smaller physical memory. Thus additional memory may be obtained while the system continues to operate, and the user may replace the bad memory with the additional memory later, at a more convenient time.

Figure 5:
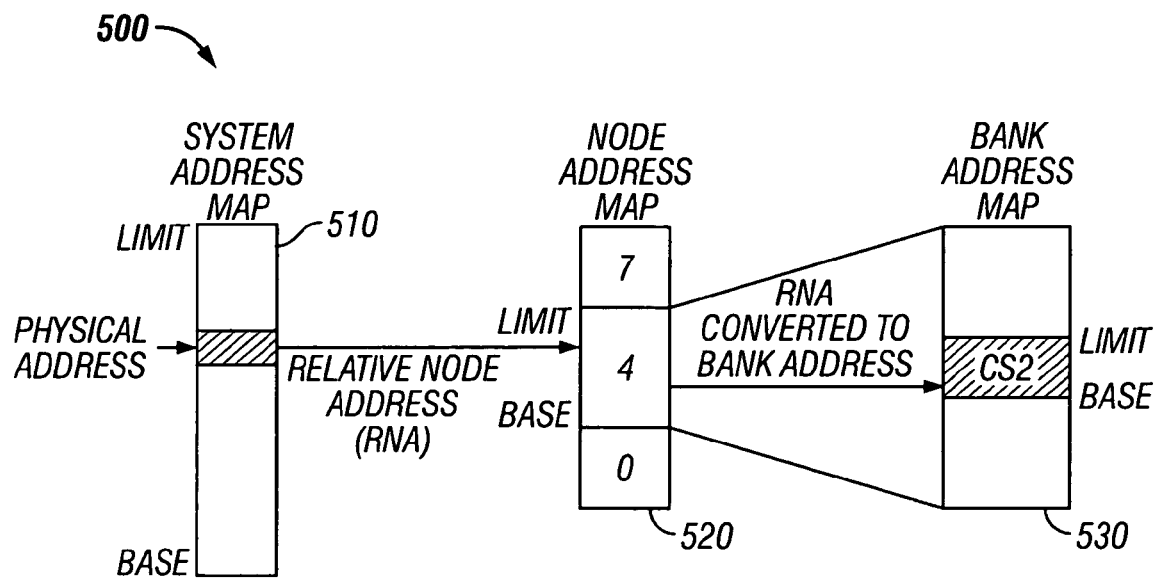
FIG. 5 illustrates a memory map of the computer system of FIG. 2.
Figure 6:
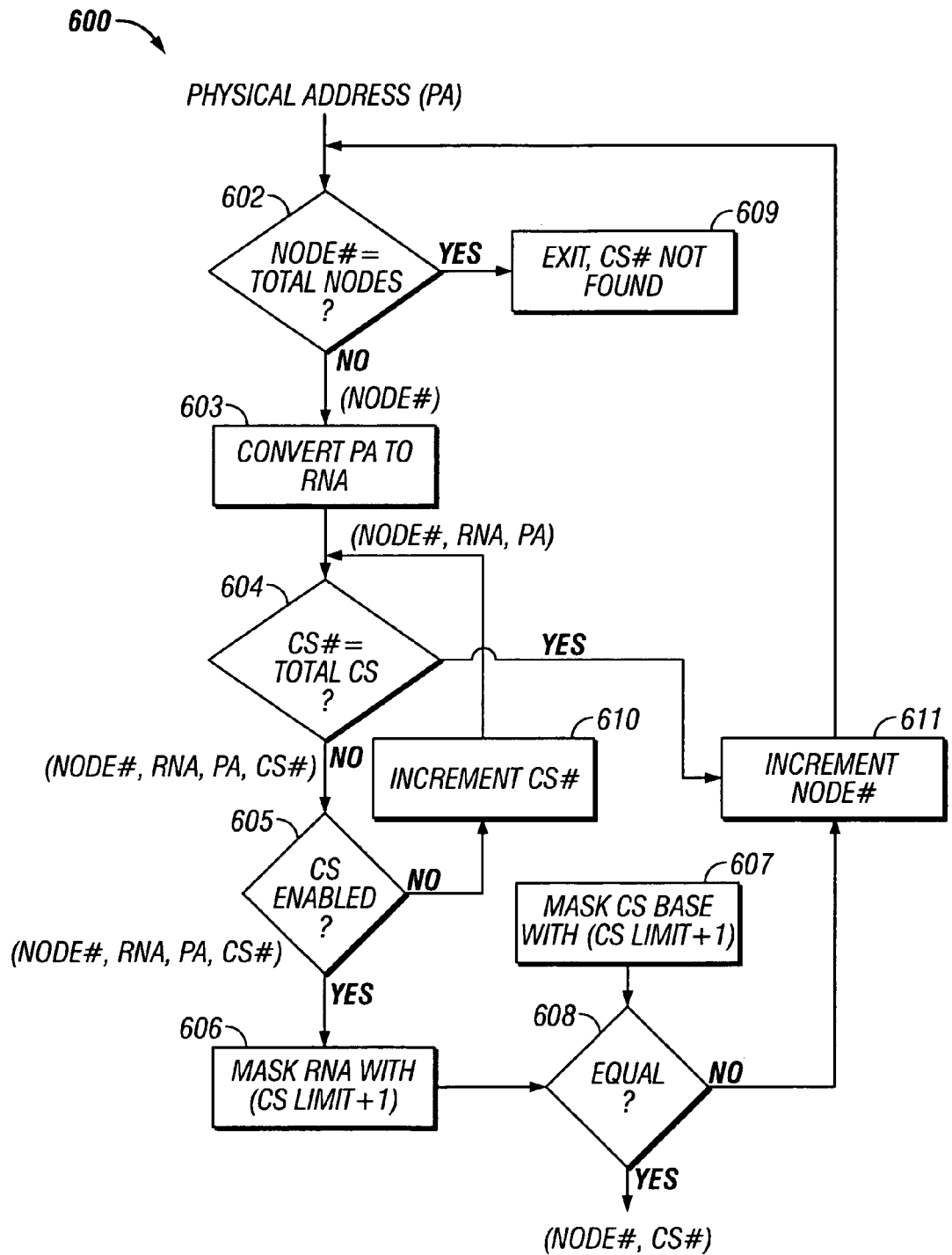
FIG. 6 illustrates a flow chart of a node and chip select determination routine used in the computer system of FIG. 2.

Further details of how the BIOS maps out bad memory elements are understood with respect to FIG. 5, which illustrates a memory map 500 of computer system 200 of FIG. 2. In order to map out failing DIMM 352, BSP 210 essentially performs a "table walk" of the memory map to find the node number and chip select number corresponding to the bad PA. However it must perform this table walk indirectly since some of the information in the memory map is distributed among the processor nodes.

More specifically memory map 500 includes three portions: a system address map 510, a node address map 520, and a bank address map 530. System address map 510 is characterized by BASE and LIMIT addresses corresponding to all the physical addresses of memory and memory-mapped I/O devices present in the system. An input physical address (PA) will be present in the system if it is in system address map 510. In the case of a contiguous memory map as in FIG. 5, the PA will be present in the system if it falls between the BASE address and the LIMIT. Non-contiguous system address maps are possible as well.

Node address map 520 includes a listing of available relative node addresses (RNAs) for all the nodes. A particular physical address will signify a node number and an RNA within that node. If the RNA has an entry in the NODE ADDRESS MAP, then it is present on that node. In the case of contiguous memory map on node 4, for example, if the RNA falls between the BASE and the LIMIT for node 4, then it is present on node 4.

The RNA will then be converted to a bank address. This bank address is an address relative to a chip select base address. If the bank address falls between the BASE and LIMIT addresses for that chip select, then it is implemented on that region or chip select.

Node address map 520 and bank address map 530 are not directly available to the BSP but exist implicitly in the programming of the memory controllers and DRAM controllers distributed among the nodes in the system. Thus instead of performing a direct table walk, the BIOS must determine the node number and the chip select number of the failing memory location indirectly. In order to determine how the BIOS uses these structures to map out bad addresses, reference is now made to FIG. 6, which illustrates a flow chart of a node and chip select determination routine 600 used in computer system 200 of FIG. 2. Routine 600 is generally part of memory test 428 as shown in FIG. 4 and provides the CS# and NODE# to pass to the beginning of POST 420 after a bad memory address has been detected. Memory test 428 calls this routine after it has detected a bad memory and prior to returning control to the beginning of POST 420. Memory test 428 passes the node number and the chip select number of the failing address to the beginning of POST 420 so that memory configuration task 424 can map the failing address out of system 200. Routine 600 receives as an input the physical address (PA) of a bad memory location. It then generally tests all nodes and all chip selects until it finds the node number and chip select number corresponding to the bad PA. It must do this because memory configuration task 424 does not save the node and chip select information after it configures all the nodes.

Routine 600 starts with NODE#=0 (in a step not shown in FIG. 6) and continues until it either finds the NODE# and CS# of the failing address, or has tested all the nodes without success. It detects whether all the nodes have been tested by determining whether the current NODE# is equal to the number of TOTAL NODES at step 602. For example, system 200 includes eight nodes so TOTAL NODES is equal to 8. If routine 600 reaches step 602 with NODE#=8 (having tested all eight nodes from NODE#=0 through NODE#=7), it exits at step 609 without having found an appropriate CS#.

However if routine 600 has not yet tested the last node, it proceeds by converting the PA to an RNA at step 603. It does this by subtracting the base address of the current NODE# from the PA. Then routine 600 steps through all chip selects on that node until it finds a chip select that was enabled, if any. Routine 600 starts with CS#=0 and increments CS# in succession until it either finds an enabled chip select or has tested the last CS#. More specifically routine 600 checks to determine whether the current CS# is equal to the number of TOTAL CS at step 604. For example each node system 200 may include up to eight chip selects, so TOTAL CS is equal to 8. If routine 600 reaches step 604 with CS#=8 (having tested all eight chip selects from CS#=0 through CS#=7), it exits the chip select search and proceeds to the next node by incrementing the NODE# at step 611 and returning to step 602. If not, it first determines whether the current CS# is enabled at step 605. Step 605 reads a register in the current NODE#, over the HT fabric, which indicates whether the current CS# is enabled. If the current CS# is not enabled, then the CS# is incremented at step 610 and the flow returns to step 604. If the current CS# is enabled, then the current CS# is a possible chip select on the current NODE# that may include the bad PA. Whether the current CS# is the actual chip select of the bad PA is then determined by steps 606-608.

Steps 606-608 determine whether the bank address is within the limit of the region defined by the current CS#. Step 608 determines whether two quantities are equal. The first quantity, determined at step 606, masks the RNA with the CS LIMIT+1. The second quantity, determined at step 607, masks the CS BASE value with CS LIMIT+1. If these two values are equal, then the current CS# and NODE# are those of the failing address. If not, the routine continues to step 611.

This routine can also be expressed in pseudo-code form, and such pseudo-code expression is listed in Appendix I. Those skilled in the art will be able to translate the concepts of the pseudo-code of Appendix I into corresponding assembly-language or high-level-language code for the particular instruction set architecture that they are using.

The BIOS disclosed herein is able to configure memory distributed among multiple nodes in a multiprocessor system, test the memory, and map out any bad memory efficiently. The BIOS does these tasks efficiently by storing the memory configuration within the associated nodes, but later finding the location of a bad memory address by methodically searching each node and each region until the affected node and region are identified. Thus the BIOS avoids having to construct and save a large memory map which in most cases will not be needed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

APPENDIX I

```
Save_Input_Address (39:8)
Calculate_Relative_Node_Address
Get_Total_Node_Number
while (Current_Node != Total_Nodes)
     while (_Current_CS_register not = Last_CS_Register)
          Read_Current_CS_Register
          If(Byte_Enable == 1)
               Restore_RNA
               Read_CS_Address
               Mask_CS_Base_with_0ffE0FE01h (CS_Base)
               Read_CS_Mask
               Mask_CS_Mask_with_0C01F01FFh (CS_Limit)
               invert_CS_limit
               (RNA) AND (invert_CS_Limit) => CSRNA
               (CS_BASE) AND (invert_CS_limit) => ICSB
               if(CSRNA == ICSB)
                    Return (CS + CurrentNodeNumber)
               Endif
          endif
          Calculate_New_RNA
     endw
     Inc Current_Node
endw
```

What is claimed is:

1. In a multiprocessor computer system having a plurality of processing nodes coupled in an array wherein each processing node is coupled to at least one other processing node, and a memory distributed among the plurality of processing nodes, a method of testing the memory comprising the steps of:
    determining a configuration of the array;
    determining an initial configuration of the memory,
    testing the memory over the array according to said initial configuration to identify a bad memory element;
    communicating said initial configuration to each of the plurality of processing nodes before said step of testing; and
    modifying said initial configuration to form a revised configuration that excludes said bad memory element.

2. The method of claim 1 further comprising the step of:
    passing control of the multiprocessor computer system with said revised configuration to an operating system.

3. The method 1 of claim 1 wherein said step of modifying said initial configuration to form said revised configuration comprises the steps of:
    identifying a bad memory block corresponding to said bad memory element; and
    forming said revised configuration to exclude said bad memory block.

4. The method of claim 3 wherein said step of modifying comprises the steps of:
    determining a node and a chip select on said node with which said bad memory block is associated using a physical address; and
    reconfiguring the memory by disabling said chip select on said node.

5. The method of claim 1 further comprising the steps of:
    identifying one of the plurality of processing nodes that is to be a boot strap processor; and
    performing said step of testing using said boot strap processor.

6. The method of claim 1 wherein said step of modifying said initial configuration to form said revised configuration comprises the step of:

communicating said revised configuration to each of the plurality of processing nodes.

7. The method of claim 1 wherein said step of determining said initial configuration comprises the step of determining said initial configuration using a system management bus coupled to the memory.

8. In a multiprocessor computer system having a plurality of processing nodes and a memory distributed among the plurality of processing nodes, a method of testing the memory comprising the steps of:

configuring the memory by programming the plurality of processing nodes with an initial configuration;

testing the memory using said initial configuration to identify a bad memory element;

determining a node and a region defined on said node which are associated with said bad memory element, wherein said step of determining said node and said region comprises the steps of, for successive ones of the plurality of processing nodes and until said region is found: determining a last enabled region on a respective processing node, if any; and determining whether a physical address of said bad memory element falls within said last enabled region;

reconfiguring the memory by programming the plurality of processing nodes with a revised configuration that excludes said region; and operating the multiprocessor computer system using said revised configuration.

9. The method of claim 8 wherein said step of operating comprises the step of:

passing control of the multiprocessor computer system with said revised configuration to an operating system.

10. The method of claim 8 further comprising the step of:

determining said initial configuration prior to said step of configuring the memory.

11. The method of claim 10 wherein said step of determining said initial configuration comprises the step of determining said initial configuration using a system management bus coupled to the memory.

12. The method of claim 8 further comprising the steps of:

identifying one of the plurality of processing nodes that is to be a boot strap processor; and performing said steps of configuring, testing, determining, and reconfiguring using said boot strap processor.

13. The method of claim 12 wherein said step of identifying comprises the step of determining that a communication controller of said one of the plurality of processing nodes is connected to a Southbridge.

14. For use in a multiprocessor computer system including:

a plurality of processing nodes coupled in an array wherein each processing node is coupled to at least one other processing node; and a memory distributed among the plurality of processing nodes, a basic input/output system (BIOS) memory adapted to be coupled to one of the plurality of processing nodes, designated a boot strap processor (BSP), said BIOS memory comprising:

a first set of instructions executable by said BSP to determine a configuration of the array;

a second set of instructions executable by said BSP to determine an initial configuration of the memory and communicate said initial configuration to said plurality of processing nodes over the array;

a third set of instructions executable by said BSP to test the memory over the array according to said initial configuration to identify a bad memory element; and a fourth set of instructions executable by said BSP to modify said initial configuration to form a revised configuration that excludes said bad memory element.

15. The BIOS memory of claim 14 wherein said first, second, third, and fourth sets of instruction are stored in a mask read only memory (ROM).

16. The BIOS memory of claim 14 wherein said first, second, third, and fourth sets of instructions are stored in an erasable programmable read only memory (EPROM).

17. The BIOS memory of claim 14 further comprising a fifth set of instructions executable by said BSP for passing control of the multiprocessor computer system with said revised configuration to an operating system.

18. The BIOS memory of claim 14 wherein said fourth set of instructions provides information about said bad memory element to said first set of instructions and causes said first set of instructions to be re-executed.

19. For use in a multiprocessor computer system including:

a plurality of processing nodes coupled in an array wherein each processing node is coupled to at least one other processing node; and a memory distributed among the plurality of processing nodes, a basic input/output system (BIOS) memory adapted to be coupled to one of the plurality of processing nodes, designated a boot strap processor (BSP), said BIOS memory comprising:

a first set of instructions executable by said BSP to configure the memory by programming the plurality of processing nodes with an initial configuration;

a second set of instructions executable by said BSP to test the memory using said initial configuration to identify a bad memory element, wherein said second set of instructions further causes said boot strap processor to communicate said initial configuration to said plurality of processing nodes over the array;

a third set of instructions executable by said BSP to determine a node and a region defined on said node which are associated with said bad memory element;

a fourth set of instructions executable by said BSP to reconfigure the memory by programming the plurality of processing nodes with a revised configuration that excludes said region; and a fifth set of instructions executable by said BSP to operate the multiprocessor computer system using said revised configuration.

20. The BIOS memory of claim 19 wherein said first, second, third, fourth, and fifth sets of instructions are stored in a mask read only memory (ROM).

21. The BIOS memory of claim 20 wherein said first, second, third, fourth, and fifth sets of instructions are stored in an erasable programmable read only memory (EPROM).

22. The BIOS memory of claim 19 wherein said fifth set of instructions operates the multiprocessor computer system using said revised configuration by transferring control to an operating system.

23. The BIOS memory of claim 19 wherein said fourth set of instructions provides information about said bad memory element to said first set of instructions and causes said first set of instructions to be re-executed.

\* \* \* \* \*